United States Patent [19]

Anderson, III et al.

[11] Patent Number: 4,622,543
[45] Date of Patent: Nov. 11, 1986

[54] SURVEILLANCE SYSTEM HAVING ACOUSTIC MAGNETOMECHANICAL MARKER

[76] Inventors: Philip M. Anderson, III, 50 Rose Terrace, Chatham, N.J. 07928; Jeffrey C. Urbanski, 62 Woodlawn Rd., Sparta, N.J. 07871

[21] Appl. No.: 592,137
[22] Filed: Mar. 22, 1984
[51] Int. Cl.$^4$ .................................. G08B 13/26
[52] U.S. Cl. .................................. 340/572; 340/551
[58] Field of Search ................ 340/572, 551

[56] References Cited

U.S. PATENT DOCUMENTS 3,713,133 1/1973 Nathans .......................... 340/572
4,510,490 4/1985 Anderson, III et al. ............ 340/551

Primary Examiner—Glen R. Swann, III

[57] ABSTRACT

An article surveillance system having an acoustic magnetomechanical marker is adapted, when armed, to resonate at a frequency provided by an incident magnetic field applied within an interrogation zone. The marker is a strip of magnetostrictive ferromagnetic material disposed adjacent to a hard magnetic element which, upon being magnetized, magnetically biases the strip and arms it to mechanically vibrate at said frequency. A substantial change in acoustic output level of the marker at the resonant frequency provides the marker with signal identity.

37 Claims, 7 Drawing Figures

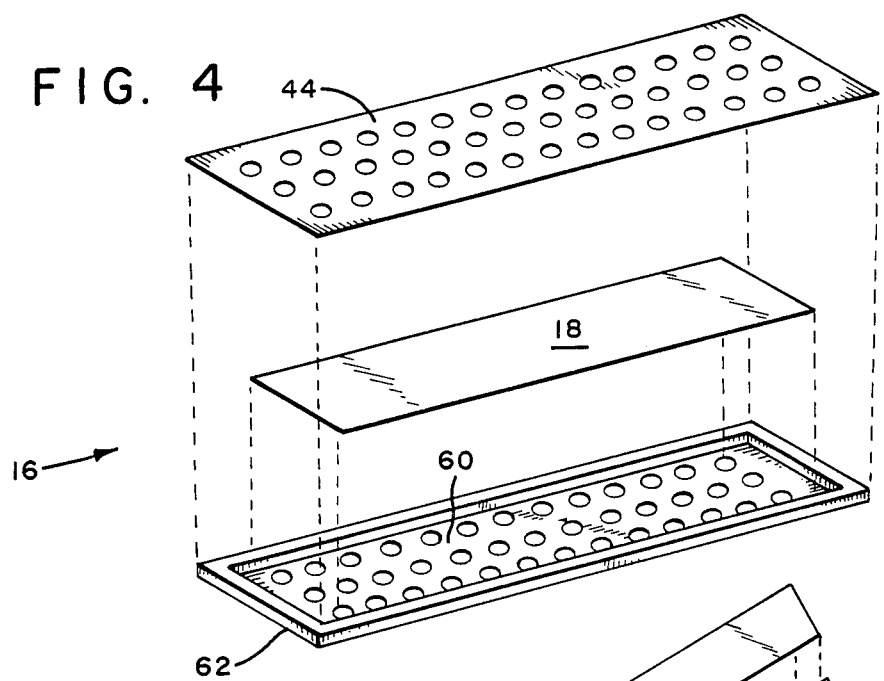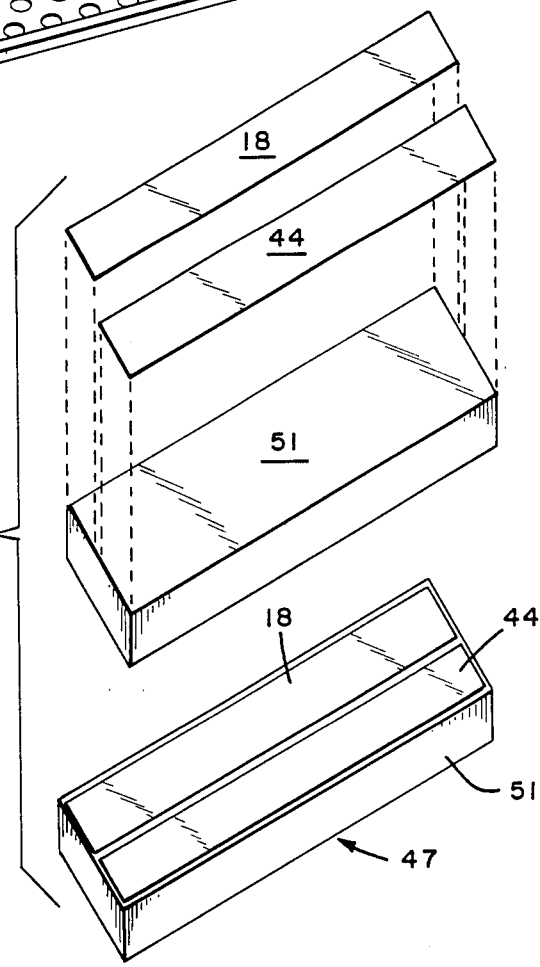

SURVEILLANCE SYSTEM HAVING ACOUSTIC MAGNETOMECHANICAL MARKER

BACKGROUND OF THE INVENTION

1. Field of the Invention

This invention relates to article surveillance systems and markers for use therein. More particularly, the invention provides a ferromagnetic metal marker that enhances the sensitivity and reliability of the article surveillance system.

2. Description of the Prior Art

The problem of protection of articles of merchandise and the like, against theft from retail stores has been the subject of numerous technical solutions. Among these, a tag or marker is secured to the article to be protected. The marker responds to an interrogation signal from transmitting apparatus situated either at the exit door of the premises to be protected, or at the aisleway adjacent to the cashier or check out station. A receiving apparatus on the opposite side of the exit or aisleway from the transmitting apparatus, receives a signal produced by the marker in response to the interrogation signal. The presence of the response signal indicates that the marker has not been removed or deactivated by the cashier, and that the article bearing it may not have been paid for or properly checked out.

Several different types of markers have been disclosed in the literature, and are in use. In one type, the functional portion of the marker consists of either an antenna and diode or an antenna and capacitors forming a resonant circuit. When placed in an electromagnetic field transmitted by the interrogation apparatus, the antenna-diode marker generates harmonics of the interrogation frequency in the receiving antenna; the resonant circuit marker causes an increase in absorption of the transmitted signal so as to change the signal in the receiving coil. The detection of the harmonic or signal level change indicates the presence of the marker. With this type of system, the marker must be removed from the merchandise by the cashier. Failure to do so indicates that the merchandise has not been properly accounted for by the cashier.

A second type of marker consists of a first elongated element of high magnetic permeability ferromagnetic material disposed adjacent to at least a second element of ferromagnetic material having higher coercivity than the first element. When subjected to an interrogation frequency of electromagnetic radiation, the marker causes harmonics of the interrogation frequency to be developed in the receiving coil. The detection of such harmonics indicates the presence of the marker. One method of deactivation of the marker is accomplished by changing the state of magnetization of the second element. Thus, when the marker is exposed to a dc magnetic field, the state of magnetization in the second element changes and, depending upon the design of the marker being used, either the amplitude of the harmonics chosen for detection is significantly reduced, or the amplitude of the even numbered harmonics is significantly changed. Either of these changes can be readily detected in the receiving coil.

Ferromagnetic harmonic generating markers are smaller, contain fewer components and materials, and are easier to fabricate than resonant-circuit or antenna-diode markers. As a consequence, the ferromagnetic marker can be treated as a disposable item affixed to the article to be protected and disposed of by the customer. Such markers may be readily deactivated by the application of a dc magnetic field pulse triggered by the cashier. Hence, handling costs associated with the physical removal requirements of resonant-circuit and antenna-diode markers are avoided.

One of the problems with harmonic generating, ferromagnetic markers is the difficulty of detecting the marker signal at large distances. The amplitude of the harmonics developed in the receiving antenna is much smaller than the amplitude of the interrogation signal, with the result that the range of detection of such markers has heretofore been limited to aisle widths less than about three feet. Another problem with harmonic generating, ferromagnetic markers is the difficulty of distinguishing the marker signal from pseudo signals generated by belt buckles, pens, hair clips and other ferromagnetic objects carried by shoppers. The merchant's fear of embarrassment and adverse legal consequences associated with false alarms triggered by such pseudo signals will be readily appreciated. Yet another problem with such ferromagnetic markers is their tendency to be deactivated or reactivated by conditions other than those imposed by components of the system. Thus, ferromagnetic markers can be deactivated purposely upon juxtaposition of a permanent magnetic or reactivated inadvertently by magnetization loss in the second ferromagnetic element thereof. For these reasons, article surveillance systems have resulted in higher operating costs and lower detection sensitivity and operating reliability than are considered to be desirable.

SUMMARY OF THE INVENTION

The present invention provides a marker capable of producing identifying signal characteristics in the presence of a magnetic field applied thereto by components of an article surveillance system. The marker has high signal amplitude and a controllable signal signature and is not readily deactivated or reactivated by conditions other than those imposed by components of the system.

In addition, the invention provides an article surveillance system responsive to the presence within an interrogation zone of an article to which the marker is secured. The system provides for high selectivity and is characterized by a high signal-to-noise ratio. Briefly stated, the system has means for defining an interrogation zone. Means are provided for generating a magnetic field of predetermined frequency within the interrogation zone. A marker is secured to an article appointed for passage through the interrogation zone. The marker comprises a strip of magnetostrictive ferromagnetic material adapted to be magnetically biased and thereby armed to resonate mechanically at a frequency within the frequency band of the incident magnetic field. A magnetic element with low coersive field, disposed adjacent to the strip of magnetostrictive material, is adapted, upon being magnetized, to arm the strip to vibrate at its mechanical resonant frequency. The strip of magnetostrictive material has a magnetomechanical coupling factor, k, greater than 0, where $k = \sqrt{(1 - f_r^2/f_a^2)}$, $f_r$ and $f_a$ being the resonant and antiresonant frequencies, respectively. Upon exposure to said magnetic bias field the marker is characterized by a substantial change in mechanical vibration when the applied ac field is at the markers resonant frequency thus providing the marker with signal identity. A detecting means detects the change in mechanical vibration of the magnetostrictive ferromagnetic material at its resonant frequency by monitoring the amplitude changes of acoustic signals produced by such mechanical vibration, and distinguishing such amplitude changes from those at frequencies other than the resonant frequency.

BRIEF DESCRIPTION OF THE DRAWINGS

The invention will be more fully understood and further advantages will become apparent when reference is made to the following detailed description of the preferred embodiment of the invention and the accompanying drawings in which:

FIG. 4 is an isometric view showing components of a marker adapted for use in the system of FIG. 1;

FIG. 5 is an isometric view of an alternate construction of a marker adapted for use in the system of FIG. 1;

DESCRIPTION OF THE PREFERRED EMBODIMENTS

The magnetomechanical marker of article surveillance system 10 can be fabricated in a number of diverse sizes and configurations. As a consequence, the invention will be found to function with many varieties of surveillance systems. For illustrative purposes the invention is described in connection with an antipilferage system wherein articles of merchandise bearing the markers are surveyed by the system to prevent theft of the merchandise from a retail store. It will be readily appreciated that the invention can be employed for similar and yet diversified uses, such as the identification of articles or personnel, wherein the marker and the system exchange magnetomechanical energy so that the marker functions as (1) personnel badge for control of access to limited areas, (2) a vehicle toll or access plate for actuation of automatic sentrys associated with bridge crossings, parking facilities, industrial sites or recreational sites, (3) an identifier for check point control of classified documents, warehouse packages, library books and the like, (4) product verification. Accordingly, the invention is intended to encompass modifications of the preferred embodiment wherein the resonant frequency of the marker provides animate or inaminate objects bearing it with signal identity.

Figure 1:
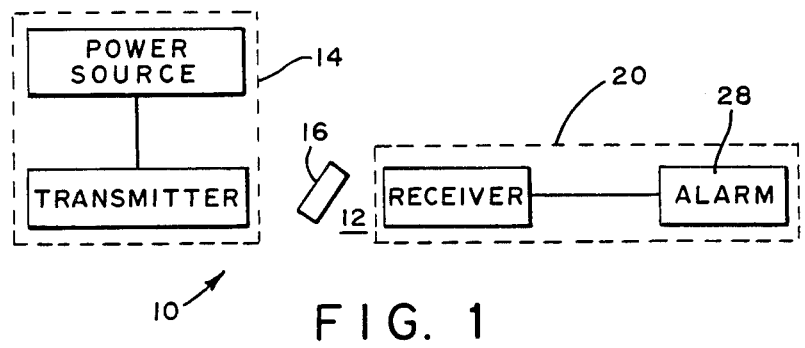
FIG. 1 is a block diagram of an article surveillance system incorporating the present invention.
Figure 2:
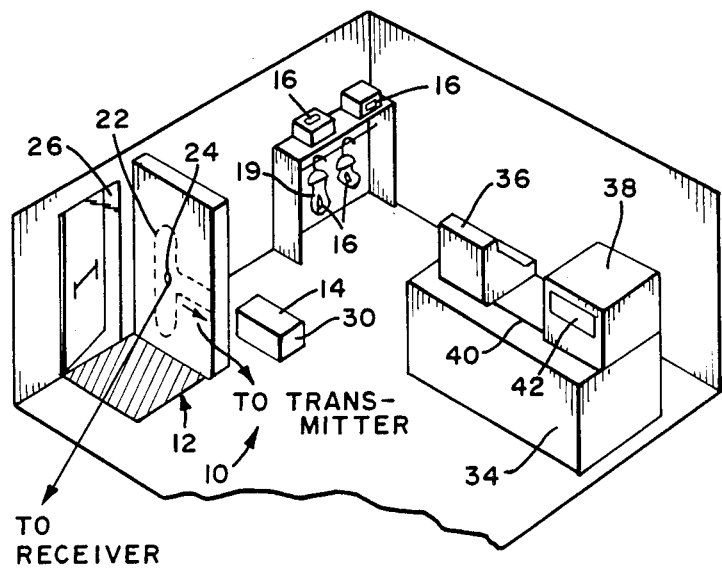
FIG. 2 is a diagrammatic illustration of a typical store installation of the system of FIG. 1.

Referring to FIGS. 1, 2 and 4 of the drawings, there is shown an article surveillance system 10 responsive to the presence of an article within an interrogation zone. The system 10 has means for defining an interrogation zone 12. A field generating means 14 is provided for generating a magnetic field of desired frequency within interrogation zone 12. A marker 16 is secured to an article 19 appointed for passage through the interrogation zone 12. The marker 16 is comprised of a strip 18 of amorphous magnetostrictive ferromagnetic material enclosed within a container 62 composed of a ferrimagnetic filled plastic, such as barium ferrite in polyester consisting of two parts: a boat 60 and a cover 44. The container must be constructed in such a manner that the strip 18 remains undamped or free to vibrate upon being placed in the boat 60 and enclosed by the cover 44. This can be accomplished by leaving approximately 1 millimeter clearance on all inside dimensions. Also the container 62 must enable sound waves produced by the mechanically vibrating strip 18 to efficiently escape to the surroundings. One method of accomplishing this is through the use of acoustic resonators such as those created by impregnating the container 62 with a network of holes. The marker is adapted, when armed, to mechanically resonate at a frequency within the range of the incident magnetic field. The hard magnetic container 62 enclosing the strip 18 of ferromagnetic material is adapted, upon being magnetized, to magnetically bias the strip 18 and thereby arm it to resonate at that frequency. The strip 18 has a magnetomechanical coupling factor, k, greater than 0, where $k = \sqrt{(1-f_r^2/f_a^2)}$, $f_r$ and $f_a$ being the resonant and anti-resonant frequencies, respectively.

Upon exposure to the magnetic field within interrogation zone 12, marker 16 is characterized by a substantial change in its acoustic output at the resonant frequency that provides marker 16 with signal identity. A detecting means 20 is arranged to detect changes in acoustic levels produced in the vicinity of the interrogation zone 12 by the presence of marker 16 therewithin.

Typically, the system 10 includes a coil unit 22 and an acoustic transducer 24 disposed in the proximity of a path leading to the exit 26 of a store. Detection circuitry, including an alarm 28, is housed within a cabinet 30 located near the exit 26. Articles of merchandise 19 such as wearing apparel, appliances, books and the like are displayed within the store. Each of the articles 19 has secured thereto a marker 16 constructed in accordance with the present invention. As shown in FIG. 4, the marker 16 includes a magneto-strictive ferromagnetic strip 18 that is normally in an activated mode. When marker 16 is in the activated mode, placement of an article 19 in the proximity of the coil unit 22 and acoustic transducer 24 of interrogation zone 12 will cause an alarm to be emitted from cabinet 30. In this manner, the system 10 prevents unauthorized removal of articles of merchandise 19 from the store.

Disposed on a checkout counter near cash register 36 is a deactivator system 38. The latter can be electrically connected to cash register 36 by wire 40. Articles 19 that have been properly paid for are placed within an aperture 42 of deactivation system 38, whereupon a magnetic field is applied to marker 16. The deactivation system 38 has detection circuitry adapted to activate a desensitizing circuit in response to acoustic signals generated by marker 16. The desensitizing circuit applies to marker 16 a magnetic field that places the marker 16 in a deactivated mode, by either increasing or decreasing the magnetic bias field strength of the hard magnetic container 62, by an amount sufficient to move the resonant frequency (fr) outside of the frequency range of the applied field or to decrease the acoustic output level sufficiently to make it undetectable. The article 19 carrying the deactivated marker 16 may then be carried through interrogation zone 12 without triggering the alarm 28 in cabinet 30.

The theft detection system circuitry with which the marker 16 is associated can be any system capable of (1) generating within an interrogation zone an incident magnetic field of desired frequency, (2) detecting changes in acoustic signals at frequencies produced in the vicinity of the interrogation zone by the presence of the marker and (3) distinguishing the particular resonant changes in acoustic output of the marker from other variations in signals detected.

Such systems typically include means for transmitting a varying electrical current from an oscillator and amplifier through conductive coils that form a frame antenna capable of developing a varying magnetic field.

In accordance with a preferred embodiment of the invention, marker 16 is composed of a magnetostrictive amorphous metal alloy. The marker is in the form of a strip having a first component composed of a composition consisting essentially of the formula $M_aN_bO_cX_dY_eZ_f$, where M is at lease one of iron and cobalt, N is nickel, O is at least one of chromium and molybdenum, X is at least one of boron and phosphorous, Y is silicon, Z is carbon, "a"–"f" are in atom percent, "a" ranges from about 35–85, "b" ranges from about 0–45, "c" ranges from about 0–7, "d" ranges from about 5–22, "e" ranges from about 0–15 and "f" ranges from about 0–2, and the sum of d+e+f ranges from about 15–25.

It has been found that a strip 18 of material having the formula specified above is particularly adapted to resonate mechanically at a preselected frequency of an incident magnetic field. While we do not wish to be bound by any theory, it is believed that, in markers of the aforesaid composition, direct magnetic coupling between ac magnetic field and the marker 16 occurs by means of the following mechanism.

When a ferromagnetic material such as an amorphous metal ribbon is in a magnetic field (H), the ribbon's magnetic domains are caused to grow and/or rotate. This domain movement allows magnetic energy to be stored, in addition to a small amount of energy which is lost as heat. When the field is removed, the domains return to their original orientation releasing the stored magnetic energy, again minus a small amount of energy lost as heat. Amorphous metals have high efficiency in this mode of energy storage. Since amorphous metals have no grain boundaries and have high resistivities, their energy losses are extraordinarily low.

When the ferromagnetic ribbon is magnetostrictive, an additional mode of energy storage is also possible. In the presence of a magnetic field, a magnetostrictive amorphous metal ribbon will have energy stored magnetically as described above but will also have energy stored mechanically via magnetostriction. The additional mode of energy storage may be viewed as an increase in the effective magnetic permeability of the ribbon.

When an ac magnetic field and a dc field are introduced on the magnetostrictive ribbon (such as can be generated by and ac and dc electric currents in a solenoid), energy is alternatively stored and released with the frequency of the ac field. The magnetostrictive energy storage and release are maximal at the material's mechanical resonance frequency and minimal at its anti-resonance. This energy storage and release induces a voltage in a pickup coil via flux density changes in the ribbon. The flux density change may also be viewed as an increase in effective magnetic permeability at the resonance frequency and a decrease at anti-resonance, thus, in effect, increasing or decreasing, respectively, the magnetic coupling between the driving solenoid and a second pickup solenoid. The voltage induced by the purely magnetic energy exchange is linear with frequency and the change in voltage with frequency is small over a limited frequency range. The voltage induced by the mechanical energy exchange is also linear with frequency except near mechanical resonance. For a thin ribbon the mechanical resonance frequency is given by:

$$f_R = \frac{1}{2L} (E/D)^{\frac{1}{2}}$$

where L, E and D are the length, Youngs modulus and mass density of the ribbon. Therefore, when the frequency of the ac magnetic field is swept around $f_r$, a characteristic signature is generated. The resonance peak is closely followed by an anti-resonance peak shown in FIG. 3. This anti-resonant peak occurs when the mechanical energy storage is near zero.

The transfer of magnetic and mechanical energy described above is called magnetomechanical coupling (MMC), and can be seen in all magnetostrictive materials. The efficiency of this energy transfer is proportional to the square of the magnetomechanical coupling factor (k), and is defined at the ratio of mechanical to magnetic energy. Phenomenologically, k is defined as $k=\sqrt{(1-f_r^2/f_a^2)}$ where $f_r$ and $f_a$ are the resonant and anti-resonant frequencies described above. The larger the k factor, the greater the voltage difference between resonant peak and anti-resonant valley. The mechanical vibrations produced by a magnetostrictive ribbon at resonance are greatly enhanced by large k values. Thus acoustic detection utilizing sound waves resulting from such mechanical vibrations is facilitated by large k values. Also, the larger the k, the larger the difference in frequency between resonance and anti-resonance. Therefore, a large k facilitates the observation of the MMC phenomena.

Coupling factors are influenced in a given amorphous metal by the level of bias field present, the level of internal stress (or structural anisotropy) present and by the level and direction of any magnetic anisotropy. Annealing an amorphous metal relieves internal stresses, thus enhancing k. The structural anisotropy is small due to the ribbon's amorphous nature, also enhancing k. Annealing in a properly oriented magnetic field can significantly enhance coupling factors. Domain movement can be maximized when the ribbon has a magnetic anisotropy which is perpendicular to the interrogating field. Because of demagnetizing field effects, it is practical to interrogate the ribbon only along its length (this being the longest dimension). Therefore, the induced magnetic anisotropy should be transverse to the long dimension of the ribbon in a saturating magnetic field which is perpendicular to ribbon length (cross-field annealed). For a ½ inch ribbon, a field of a few hundred oersted is required. The optimum time and temperature of the anneal depends on the alloy employed. As an example, an iron-boron-silicon alloy yields an optimum coupling (k>0.90) when cross-field annealed at 400° C. for 30 minutes. This anneal yields an optimum bias field of 1 Oe. For alloys having the compositions specified hereinabove, the annealing temperature ranges from about 300° to 450° C. and the annealed time ranges from about 7 to 120 min.

The anneal also effects the bias field required to optimize k. For a given amorphous metal with a given anneal, the coupling depends strongly on the bias field.

At zero and saturating fields, the coupling is zero (no resonant and anti-resonant phenomena). For a given alloy, an optimum bias field exists which yields a maximum k. For alloys having the compositions specified herein, the bias field required to optimize k ranges from about 0.1 to 20 Oe.

Even though most magnetostrictive materials will exhibit some MMC, amorphous metals yield extremely high coupling factors, and are, therefore highly preferred. As-cast amorphous metals yield higher k than most other magnetostrictive materials. No material has higher k than amorphous metals when cross-field annealed. Amorphous metals have high k because they have:

(a) low magnetic losses (no grain boundries, high resistivity), (b) low structural and stress anisotropy, (c) reasonable magnetostriction and (d) can be given a beneficial magnetic anisotropy.

Amorphous metal alloys make good targets because (a) they have high k—even as-cast, (b) they are mechanically strong, tough and ductile, (c) they require low bias fields and (d) they have extremely high magnetostrictivity (they develop a large force upon resonating and are, therefore, more difficult to damp out). It will be appreciated, therefore, that the amorphous metals of which the marker of this invention is composed need not be annealed, but may be incorporated into the marker "as cast".

Examples of amorphous ferromagnetic marker compositions in atomic percent within the scope of the invention are set forth below in Table 1.

TABLE 1

| ALLOY | AS-CAST k | OPTIMAL ANNEALED k |
|---|---|---|
| $Fe_{78}Si_9B_{13}$ | 0.35 | >0.90 |
| $Fe_{79}Si_5B_{16}$ | 0.31 | >0.90 |
| $Fe_{81}B_{13.5}Si_{3.5}C_2$ | 0.22 | >0.90 |
| $Fe_{67}Co_{18}B_{14}Si_1$ | 0.45 | 0.72 |
| $Fe_{40}Ni_{38}Mo_4B_{18}$ | 0.23 | 0.59 |

Examples of amorphous metals that have been found unsuitable for use as article surveillance system markers as set forth in Table 2.

TABLE 2

| COMPOSITION PERCENT | |
|---|---|
| EXAMPLE 1 | EXAMPLE 2 |
| Ni at. % 71.67 | Ni at. % 65.63 |
| wt. % 84.49 | wt. % 76.97 |
| Cr at. % 5.75 | Cr at. % 11.5 |
| wt. % 6 | wt. % 12.0 |
| B at. % 12.68 | B at. % 11.58 |
| wt. % 2.75 | wt. % 2.5 |
| Si at. % 7.10 | Si at. % 7.13 |
| wt. % 4 | wt. % 4 |
| Fe at. % 2.23 | Fe at. % 3.14 |
| wt. % 2.5 | wt. % 3.5 |
| C at. % .25 | C at. % .12 |
| wt. % .06 | wt. % .03 |
| P at. % .032 | P at. % — |
| wt. % .02 | wt. % — |
| S at. % .031 | S at. % — |
| wt. % .02 | wt. % — |
| Al at. % .093 | Al at. % — |
| wt. % .05 | wt. % — |
| Ti at. % .052 | Ti at. % — |
| wt. % .05 | wt. % — |
| Zr at. % .027 | Zr at. % — |
| wt. % .05 | wt. % — |
| Co at. % .085 | Co at. % .85 |
| wt. % .1 | wt. % 1.0 |

The amorphous ferromagnetic metal marker of the invention is prepared by cooling a melt of the desired composition at a rate of at least about $10^5$ C./sec, employing metal alloy quenching techniques well-known to the amorphous metal alloy art; see, e.g., U.S. Pat. No. 3,856,513 to Chen et al. The purity of all compositions is that found in normal commercial practice.

The variety of techniques are available for fabricating continuous ribbon, wire, sheet, etc. Typically, a particular composition is selected, powders or granules of the requisite elements in the desired portions are melted and homogenized, and the molten alloy is rapidly quenched on a chill surface, such as a rapidly rotating metal cylinder.

Under these quenching conditions, a metastable, homogeneous, ductile material is obtained. The metastable material may be amorphous, in which case there is no long-range order. X-ray diffraction patterns of amorphous metal alloy show only a diffuse halo, similar to that observed for inorganic oxide glasses. Such amorphous alloys must be at least 50% amorphous to be sufficiently ductile to permit subsequent handling, such as stamping complex marker shapes from ribbons of the alloys without degradation of the marker's signal identity. Preferably, the amorphous metal marker must be at least 80% amorphous to attain superior ductility.

The metastable phase may also be a solid solution of the constituent elements. In the case of the marker of the invention, such metastable, solid solution phases are not ordinarily produced under conventional processing techniques employed in the art of fabricating crystalline alloys. X-ray diffraction patterns of the solid solution alloys show the sharp diffraction peaks characteristics of crystalline alloys, with some broadening of the peaks due to desired find-grained size of crystallites. Such metastable materials are also ductile when produced under the conditions described above.

The magnetostrictive strip 18 of which marker 16 is comprised is advantageously produced in foil (or ribbon) form, and may be used in theft detection applications as cast, whether the material is amorphous or a solid solution. Alternatively, foils of amorphous metal alloys may be heat treated to obtain a crystalline phase, preferably find-grained, in order to promote longer die life when stamping of complex marker shapes is contemplated.

The amorphous ferromagnetic material of strip 18 is exceedingly ductile. By ductile is meant that the strip 18 can be bent around a radius as small as ten times the foil thickness without fracture. Such bending of the strip 18 produces little or no degradation in magnetic properties generated by the marker upon application of the interrogating magnetic field thereto. As a result, the marker retains its signal identity despite being flexed or bent during (1) manufacture (e.g., cutting, stamping or otherwise forming the strip 18 into the desired length and configuration) and, optionally, applying hard magnetic biasing magnetics thereto to produce an on/off marker, (2) application of the marker 16 to the protected articles 19, (3) handling of the articles 19 by employees and customers and (4) attempts at signal destruction designed to circumvent the system 10.

There are numerous alternate marker configurations in which an acoustic signal is produced by interrogating such markers at their resonant frequency. These alternate marker configurations can be summarized by describing two general catagories. One catagory entails a marker 16 wherein a strip 18 is disposed adjacent to a ferromagnetic element 44, such as a biasing magnetic capable or applying a dc field to strip 18. The biasing magnetic has a configuration and disposition adapted to provide strip 18 with a single pair of magnetic poles, each of the poles being at opposite extremes of the long dimension of strip 18. The composite assembly is then placed within the hollow recess 60 of a rigid container 62 impregnated with a network of holes composed of polymeric material such as polyethylene or the like, to protect the assembly against mechanical damping and to allow sound waves to efficiently escape to the surroundings. The biasing magnet 44 is typically a flat strip of high coercivity material such as SAE 1095 steel, Vicalloy, Remalloy or Arnokrome. Biasing magnet 44 is a hard magnetic element which can, alternatively, comprise a crystalline region of the amorphous material. Such biasing magnet 44 is held in the assembly in a parallel, adjacent plane, such that the high coercivity material does not cause mechanical interference with the vibration of the strip 18. Generally, biasing magnet 44 acts as one surface of the package. Alternatively, two pieces of high magnetic coercivity material may be placed at either end of strip 18, with their magnetic poles so arranged as to induce a signal pole-pair therein. This configuration of the assembly is thinner but longer than that utilizing a signal piece of high coercivity material in an adjacent parallel plane to the permeable strip. Alternatively the bias field can be supplied by an external field coil pair disposed remotely from the marker in the exit or aisleway. In this embodiment, the biasing magnet made of high coercivity material would not be required. Such a marker is not readily deactivated in the manner of markers equipped with biasing magnet 44. Further biasing magnet 44 can comprise a plurality of pieces of high magnetic coercivity material, as in the order of up to 10 or more pieces, disposed longitudinally of strip 18.

The second category (FIG. 5) entails a marker 47 wherein the strip 18 is disposed to become the driver of an acoustic reasonator. These configurations include any marker in which the strip 18 is physically adhered to a block 51 of structurally rigid material. Such configurations produce acoustic signals at frequencies other than the resonant frequency of the strip 18 resulting from the mechanical vibrations of the attached block 51. The means of biasing such markers remains the same as that used in the previously described marker configuration. The advantage of this configuration lies in the simplicity of construction and the ability to greatly alter the detectable frequency range of the marker. The main drawback in using such configurations stems from the decreased signal to noise ratio resulting from the increased mass of the resonator.

Unlike markers which generate harmonics of the interrogation frequency in a pickup coil, resonant frequency markers generate a distinctive increase in the acoustic level induced in the acoustical detection system when the primary or drive frequency equals the resonant frequency. In the case of harmonic generating markers, the feature which distinguishes the presence of the high magnetic permeability material in the marker from other ferromagnetic materials in the generation of harmonics of high order. Hence, in order to distinguish between the two materials, detection of the presence of these high order harmonics is required. Typically, the voltage of high order harmonics is only a few percent of the voltage of the primary or drive frequency.

Figure 3:
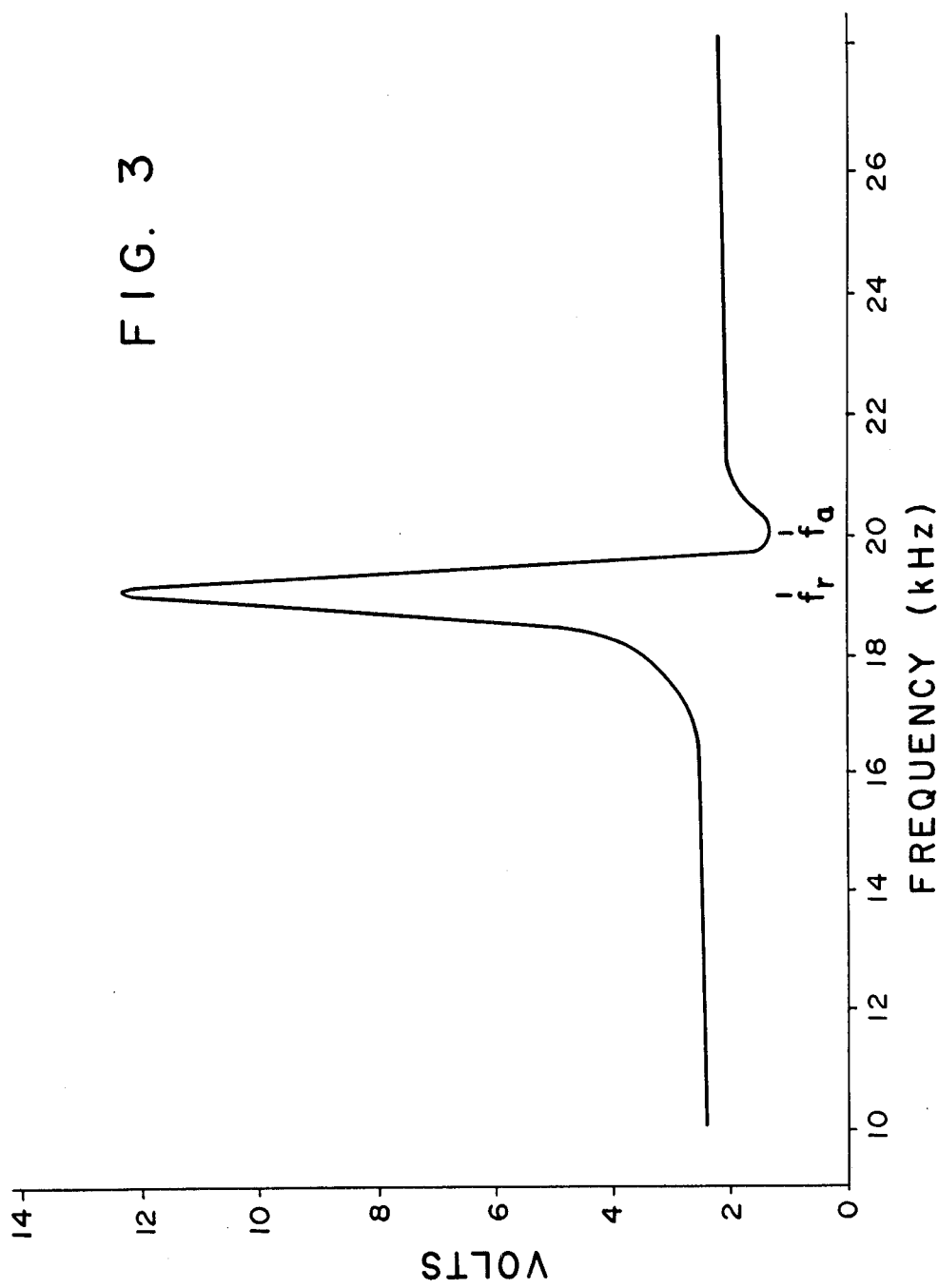
FIG. 3 is a graph showing the voltage induced by mechanical energy exchange of a strip of amorphous magnetostrictive ferromagnetic material over a preselected frequency range.

In contrast, the resonant frequency marker of the present invention is distinguished from other objects by the particular signal shape generated by the marker when the drive frequency passes through the resonant frequency of the marker. Requiring that a bias field be present also facilities the process of distinguishing the marker from other items. The marked effect upon the fundamental acoustic level induced in the acoustical detection system by the marker makes it easy to detect in the presence of other objects. Note that such markers can be detected by electromagnetic means such as those described in U.S. patent application, Ser. No. 373,061, filed Apr. 29, 1982 as well as acoustic means, however, markers described in the aforementioned patent application produce acoustic signals too weak to be detected at distances greater than about ½ meter. The acoustic markers described herein can operate with the acoustic transducer displaced by a distance in excess of six meters (20 feet) from these markers. Acoustic markers enable the detection system to continuously monitor the markers output as a result of the differing modes of interrogation and detection of such markers. Markers in which the detection system and interrogation system utilize the same mode of interaction creates differentiating detection problems between the interrogation systems output and the markers output. FIG. 3 shows the increase in induced voltage in a pickup coil caused by a marker when the interrogating field is swept around the resonant frequency of the marker. The acoustic marker's output is similar in characteristics to those of the aforesaid U.S. patent application, Ser. No. 373,061, filed Apr. 29, 1982 as shown in FIG. 3 with the exception of the anti-resonant frequency, which is obscured by acoustic background noise levels. This voltage increase occurs only when the marker is subjected to a magnetic field whose frequency is equal to the resonant frequency of the marker.

Figure 6:
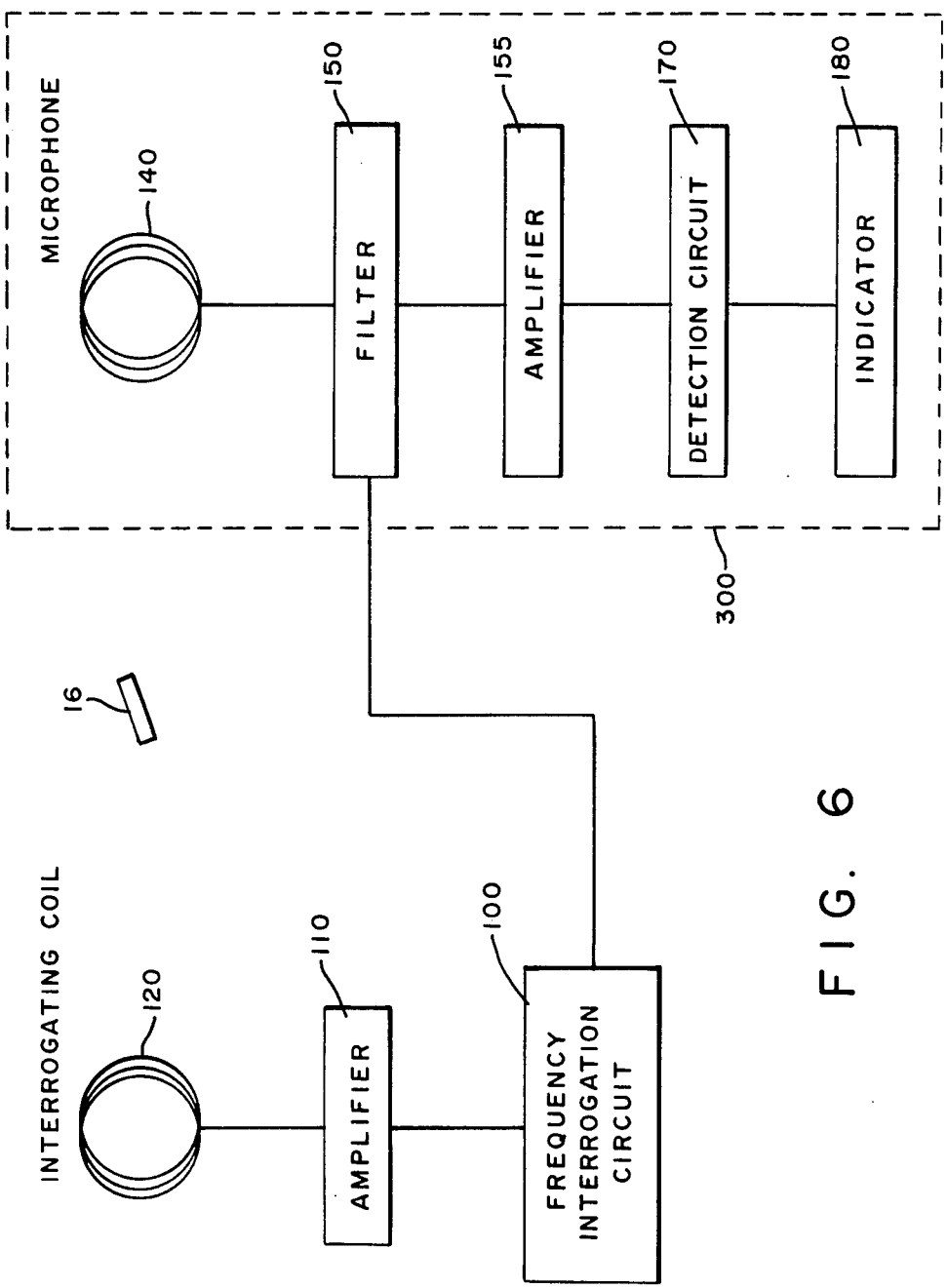
FIG. 6 is a schematic electrical diagram of an interrogation and detection scheme comprising part of the article surveillance system of FIG. 1.

In operation, the system is equipped with an interrogation and detection circuit, shown in FIG. 6. A variable frequency or single frequency oscillator 100 the output frequency of which matches that of the markers to be employed drives an amplifier 110 whose output is applied to an interrogation coil 120 such that an ac field is developed in the space through which the marker 16 and other materials are to pass. The interrogation coil 120 is so configured as to provide an essentially uniform flux density in the interrogation zone. This may be accomplished by means of a Helmholtz configuration, or some other suitable arrangement. The amplifier 110 has its impedance matched with that of interrogating coil 120 to maximize the efficiency of amplifier 110 and thereby minimize the power requirements thereof.

The acoustic detection system 300 comprises a detector-transducer (microphone) 140 whose output is conditioned by a narrow band pass filter 150 and then amplified by a power amplifier 155. The amplified conditioned signal is then applied to the input of the detector 170. A signal level above the threshhold is created by the presence of a marker 16 within the interrogation zone 12 causing an alarm signal to be generated by the detector 70. Demagnetization of the biasing magnet by the clerk, upon checkout, alters the resonant frequency and prevents detection.

The magnetude of the filtered, amplified signal for a variety of articles placed in the interrogation zone depicted in FIG. 6 is set forth in Table 3 below:

TABLE 3

| Material (atom %) | Structure | Signal |
| --- | --- | --- |
| Fe(51), Ni(49) | microcrystalline | less than 50 mV |
| Ni | " | " |
| (NiZn)$_{0.5}$Fe$_2$O$_4$* | " | " |
| Fe$_{40}$Ni$_{38}$Mo$_4$B$_{18}$ | amorphous | 120 V |

*chemical formula

The article surveillance system 10 which has been disclosed herein can, of course, be modified in numerous ways without departing from the scope of the invention. For example, the hard magnetic material that supplies dc bias to activate the marker may alternatively be used to magnetically saturate the magnetostrictive strip 18, and thereby deactivate the marker 16. The dc bias may be generated (1) by an electric coil, (2) by the earth's field or (3) by utilizing the remanent flux in the magnetostrictive material of strip 18. Instead of interrogating the marker 16 with a constant frequency, interrogation can entail continuously sweeping the interrogation frequency about the resonant frequency of the marker to induce the marker to vibrate, and thereafter detecting the substantial change in acoustic levels occurring at the mechanical resonance frequency of the marker. Instead of continuously sweeping the interrogation frequency about the resonant frequency of the marker to induce the marker to vibrate, and thereafter detecting the substantial change in acoustic levels occurring at the mechanical resonance frequency of the marker. Additionally an interrogating pulse or burst may be used to excite the marker into oscillation. After an interrogating signal of the pulse or burst type is over, the marker will undergo damped oscillation at its resonance frequency. The vibrating marker will cause an acoustic signal to be detected in the acoustic transducer (microphone) at the resonant frequency. Several types of signals can be used to energize the marker. For example, the marker may be energized by a single having the form of a signal frequency sine wave burst, the frequency of which is centered at the markers natural resonance. Other similar modifications can be made which fall within the scope of the present invention. It is accordingly intended that all matter contained in the above description and shown in the accompanying drawings be interpreted as illustrative and not in a limiting sense.

Figure 7:
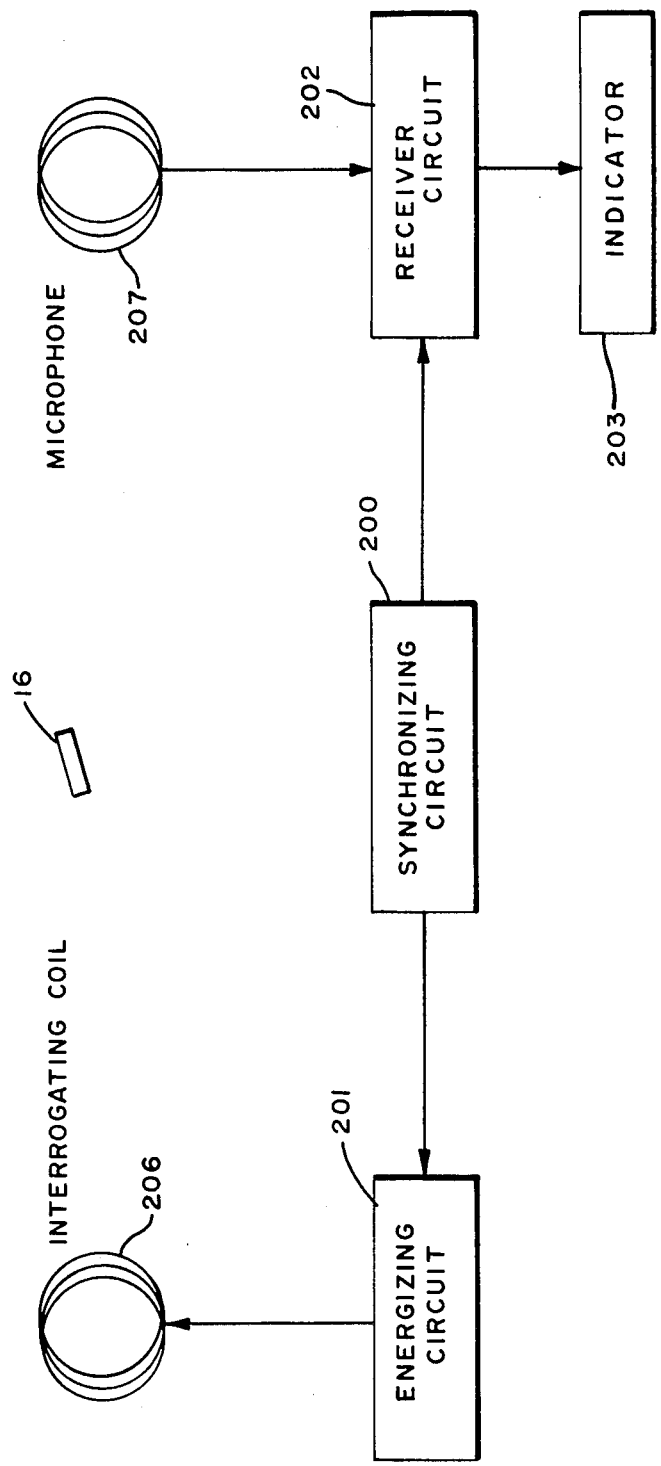
FIG. 7 is a schematic electrical diagram of an interrogation and detection scheme comprising a part of an alternative embodiment of the article surveillance system of FIG. 1.

More specifically, there is illustrated in FIG. 7 an alternative system for interrogating and detecting the marker 16. Synchronizing circuit 200 controls the operation of energizing circuit 201 and receiving circuit 202. The synchronizing circuit 200 sends a synchronizing gate pulse to the energizing circuit 201 which activates the energizing circuit 201. Upon being activated the energizing circuit 201 generates and sends an interrogation signal to interrogating coil 206 for the duration of the synchronizing pulse. An interrogating magnetic field generated by the coil 206 excites marker 16 into mechanical resonance. Upon completion of the interrogating signal, the synchronizing circuit 200 produces a gate pulse to the receiver circuit 202, which activates the receiver circuit 202. During the period that receiver circuit 202 is activated, the marker if present, will generate a signal at the frequency of mechanical resonance of the marker in the acoustic transducer (microphone) 207. When the marker frequency is sensed, by receiver 202, the receiver applies a voltage to indicator 203, which records the presence of the marker 16.

The interrogating signal generated by energizing circuit 201 may be a single frequency sine wave burst whose frequency is centered at the markers natural resonance. Alternatively, the interrogating signal may be an impulse whose width is less than or equal to $1/(2f_r)$, where $f_r$ is the marker's resonant frequency. In yet another embodiment of the invention, the interrogating signal may be a burst of noise or a composite signal whose frequency spectrum contains the resonant frequency of the marker.

Having thus described the invention in rather full detail, it will be understood that such detail need not be strictly adhered to but that various changes and modifications may suggest themselves to one skilled in the art, all falling within the scope of the invention as defined by the subjoined claims.

What we claimed is

1. For use in a magnetic article surveillance system, a marker which, when armed, is adapted to resonate at a frequency provided by an incident magnetic field applied within an interrogation zone and to have a substantial change in acoustic output level at said frequency that provides said marker with signal identity, said marker being a strip of magnetostrictive ferromagnetic material disposed adjacent to a hard magnetic element which, upon being magnetized, magnetically biases said strip and arms it to resonate at said frequency, said strip having magnetomechanical coupling factor, k greater than 0, where $k=\sqrt{(1-f_r^2/f_a^2)}$, $f_r$ and $f_a$ being the resonate and anti-resonant frequencies, respectively.

2. A marker as recited in claim 1, wherein said material is at least 50 percent amorphous.

3. A marker as recited in claim 1, wherein said material is at least 80 percent amorphous.

4. A marker as recited in claim 1, wherein said hard magnetic element has a coercivity higher than that of said magnetostrictive material.

5. A marker as recited in claim 1, wherein said hard magnetic element is adapted to be magnetized to arm said strip and thereby increase the resonance thereof at said frequency.

6. A marker as recited in claim 5, wherein said hard magnetic element comprises a crystalline region of said amorphous material.

7. A marker as recited in claim 5, wherein said increase in resonance of said marker provides it with signal identity.

8. A marker as recited in claim 1, wherein said hard magnetic element is in the form of a container in which said strip is enclosed in such a manner as to allow said strip to vibrate freely.

9. A marker as recited in claim 8, wherein said container is constructed in such a manner as to efficiently transmit acoustic signals.

10. A marker as recited in claim 1, wherein said strip is enclosed within a nonmagnetic container in such a manner as to allow to strip to vibrate freely while efficiently transmitting acoustic signals.

11. A marker as recited in claim 10, wherein said hard magnetic element is affixed to said container.

12. A marker as recited in claim 2, wherein said material has a composition consisting essentially of the formula $M_aN_bO_cX_dY_eZ_f$, where M is at least one of iron and cobalt, N is nickle, O is at least one of chromium and molybdenum, X is at least one of the boron and phosphorous, Y is silicon, Z is carbon, "a"–"f" are in atom percent, "a" ranges from about 35–85, "b" ranges from about 0–45, "c" ranges from about 0–7, "d" ranges from about 5–22, "e" ranges from about 0–15 and "f" ranges from about 0–2, and the sum of d+e+f ranges from about 15–25.

13. A marker as recited in claim 4, wherein said hard magnetic element comprises a plurality of pieces of high magnetic coercivity material.

14. For use in a magnetic article surveillance system, a marker adapted to resonate at a frequency provided by an incident magnetic field applied within an interrogation zone, and having a substantial change in acoustic output at said frequency that provides said marker with signal identity, said marker being a strip of magnetostrictive ferromagnetic material adapted to be magnetically biased and thereby armed to resonate at said frequency, said strip having a magnetomechanical coupling factor, k, greater than 0, where $k = \sqrt{(1 - f_r^2/f_a^2)}$, $f_r$ and $f_a$ being the resonant and anti-resonant frequencies, respectively.

15. A marker as recited in claim 14, wherein said material is at least 50 percent amorphous.

16. A marker as recited in claim 14, wherein said material is at least 80 percent amorphous.

17. A marker as recited in claim 14, wherein said marker has at least one hard magnetic element disposed adjacent thereto and adapted to bias said strip and arm it to resonate at said frequency.

18. A marker as recited in claim 14, wherein said hard magnetic element has coercivity higher than said magnetostrictive material.

19. A marker as recited in claim 17, wherein said hard magnetic element has coercivity higher than said amorphous material.

20. A marker as recited in claim 19, wherein said hard magnetic element is adapted to be magnetized to disarm said strip and thereby decrease resonance thereof at said frequency.

21. A marker as recited in claim 20, wherein said decrease in resonance of said marker causes it to lose its signal identity.

22. A marker as recited in claim 15, wherein said material has a composition consisting essentially of the formula $M_a N_b O_c X_d Y_e Z_f$, where M is at least one of iron and cobalt, N is nickel, O is at least one of chromium and molybdenum, X is at least one of boron and phosphorous, Y is silicon, Z is carbon, "a"–"f" are in atom percent, "a" ranges from about 35–85, "b" ranges from about 0–45, "c" ranges from about 0–7, "d" ranges from about 5–22, "e" ranges from about 0–15 and "f" ranges from about 0–2, and the sum of d+e+f ranges from about 15–25.

23. A marker as recited in claim 14, wherein said strip is adapted to mechanically vibrate a block of structurally rigid material upon being affixed to said block.

24. A marker as recited in claim 23, wherein said hard magnetic element is affixed to said block.

25. A marker as recited in claim 14, wherein said incident magnetic field is of continuous frequency corresponding to said marker's resonant frequency.

26. A marker as recited in claim 14, wherein said incident magnetic field is swept to provide said frequency.

27. A marker as recited in claim 14, wherein said frequency is in the form of a pulse.

28. A marker as recited in claim 27, wherein said pulse has a width less than or equal to $1/(2f_r)$, where $f_r$ is the resonant frequency of said strip.

29. An article surveillance system responsive to the presence of a marker within an interrogation zone, comprising:
   a. means for defining an interrogation zone;
   b. generating means for generating a magnetic field having a frequency band within said interrogation zone, said generating means including an interrogating coil,
   c. a marker secured to an article appointed for passage through said interrogation zone, said marker being characterized by a substantial change in its acoustic output level within said frequency band that provides said marker with signal identity, and comprising an elongated ductile strip of magnetostrictive, ferromagnetic material adapted to be magnetically biased and thereby armed to resonate mechanically at a frequency within the frequency band of said magnetic field, said strip having a magnetomechanical coupling factor, k, greater than 0, wherein $k = \sqrt{(1 - f_r^2/f_a^2)}$, $f_r$ and $f_a$ being the resonant and anti-resonant frequencies, respectively; and
   e. detecting means for detecting resonance of said marker, within said interrogation zone at said resonant frequency and distinguishing said change in its acoustic output level from changes in acoustic output at other than the resonant frequency of said marker.

30. An article surveillance system as recited in claim 29, wherein said generating means includes energizing means adapted to provide a continuous signal at the resonant frequency of said marker.

31. An article surveillance system as recited in claim 29 wherein said generating means includes frequency sweeping means adapted to sweep through the resonant frequency of said marker.

32. An article surveillance system as recited in claim 29, wherein said generating means includes energizing means adapted to provide said interrogating coil with a burst of single frequency sine wave.

33. An article surveillance system as recited in claim 29, wherein said generating means includes energizing means adapted to provide said interrogating coil with a pulse, the width of which is less than or equal to $1/(2f_r)$, where $f_r$ is the marker's resonant frequency.

34. An article surveillance system as recited in claim 29, wherein said generating means includes energizing means adapted to provide said interrogation coil with a burst of noise.

35. An article surveillance system as recited in claim 29, wherein said generating means includes energizing means adapted to provide said interrogating coil with a swept frequency sine wave.

36. An article surveillance system as recited in claim 29, wherein said detecting means includes receiving means for distinguishing the frequency of marker resonance detected within said interrogation zone from other frequencies induced therein.

37. An article surveillance system as recited in claim 36, wherein said detection system includes an acoustic transducer adapted to monitor said marker's resonant frequency.

* * * * *